(12) United States Patent
Olsen et al.

(10) Patent No.: US 12,637,395 B2
(45) Date of Patent: May 26, 2026

(54) INCORPORATION OF NANOPARTICLES WITH GRANULAR FERTILIZERS

(71) Applicant: Aqua Yield Operations, Inc., Sandy, UT (US)

(72) Inventors: Garrett Olsen, Sandy, UT (US); Mark Slavens, Sandy, UT (US)

(73) Assignee: Aqua Yield Operations, Inc., Sandy, UT (US)

( * ) Notice: Subject to any disclaimer, the term of this patent is extended or adjusted under 35 U.S.C. 154(b) by 623 days.

(21) Appl. No.: 18/171,996

(22) Filed: Feb. 21, 2023

(65) Prior Publication Data

US 2024/0279135 A1 Aug. 22, 2024

(51) Int. Cl.
*C05G 5/30* (2020.01)
*B82Y 30/00* (2011.01)

(52) U.S. Cl.
CPC ............... *C05G 5/37* (2020.02); *B82Y 30/00* (2013.01)

(58) Field of Classification Search
CPC ... C05G 5/37; C05G 5/30; C05G 5/40; C05G 5/10; B82Y 30/00
See application file for complete search history.

(56) References Cited

U.S. PATENT DOCUMENTS

2022/0213004 A1* 7/2022 Bunderson ............... C05G 1/00
2024/0199507 A1* 6/2024 Korekane ............... C05G 5/38

* cited by examiner

*Primary Examiner* — Jennifer A Smith
(74) *Attorney, Agent, or Firm* — TechLaw Ventures, PLLC; Terrence J. Edwards

(57) ABSTRACT

Granular fertilizers for efficient plant uptake of nutrients and delayed release of fertilizer compounds. A composition includes a granular fertilizer and an ion exchange nanoparticle, wherein the ion exchange nanoparticle comprises a structural particle comprising an ion exchange site and an ion, wherein the ion is attracted to the structural particle at the ion exchange site.

19 Claims, 11 Drawing Sheets

400

Dehydrated Nanoparticles
104

Molten Fertilizer
402

Molten Solution
406

Cooling

Fertilizer
Composition
100

1. Heat Granular Fertilizer To Liquid Phase.

2. Combine Dehydrated Nanoparticles And Molten Fertilizer.

3. Cool Molten Solution To Generate Fertilizer Mixture Including Solid Nanoparticles And Solid Granular Fertilizer.

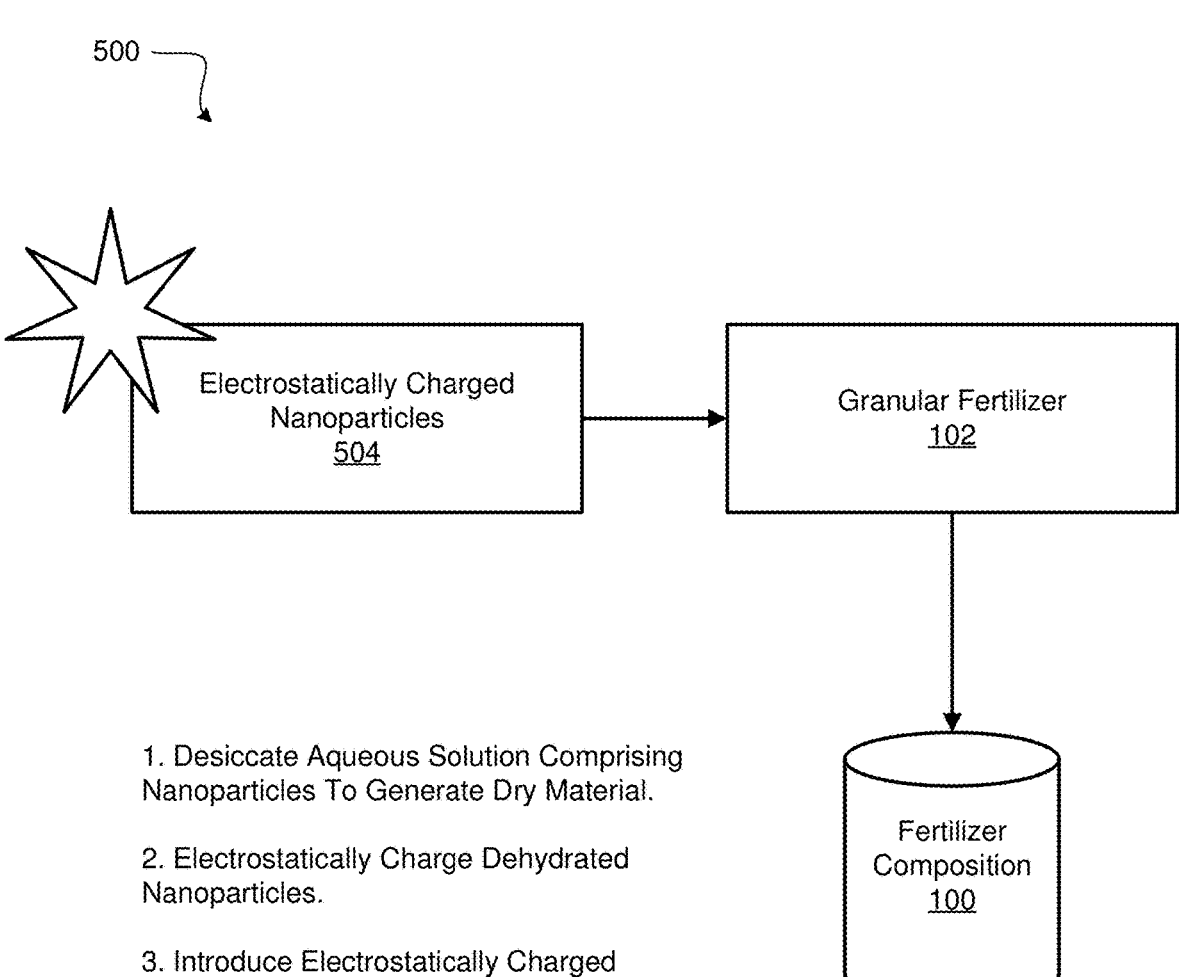

500

Electrostatically Charged
Nanoparticles
504

Granular Fertilizer
102

Fertilizer
Composition
100

1. Desiccate Aqueous Solution Comprising
Nanoparticles To Generate Dry Material.

2. Electrostatically Charge Dehydrated
Nanoparticles.

3. Introduce Electrostatically Charged
Dehydrated Nanoparticles To Granular
Fertilizer.

4. Nanoparticles Are Attracted To Granular
Fertilizer To Generate Fertilizer Mixture.

FIG. 5

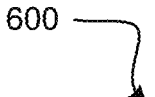
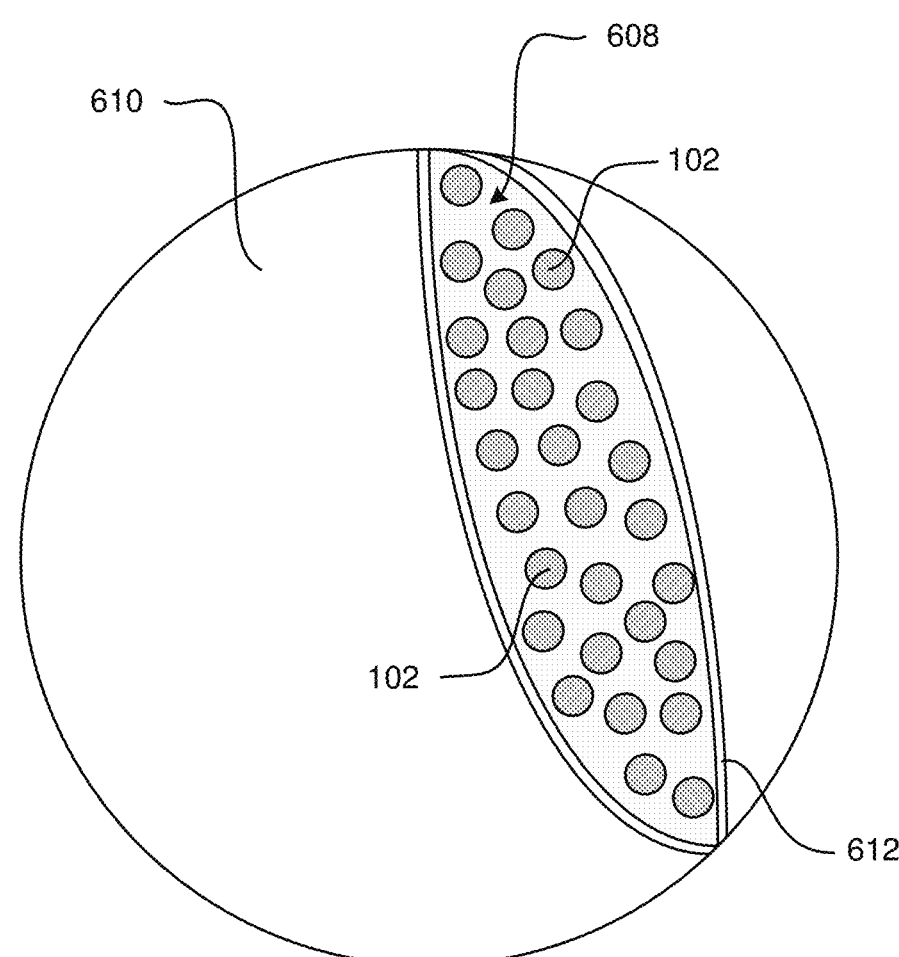
FIG. 6

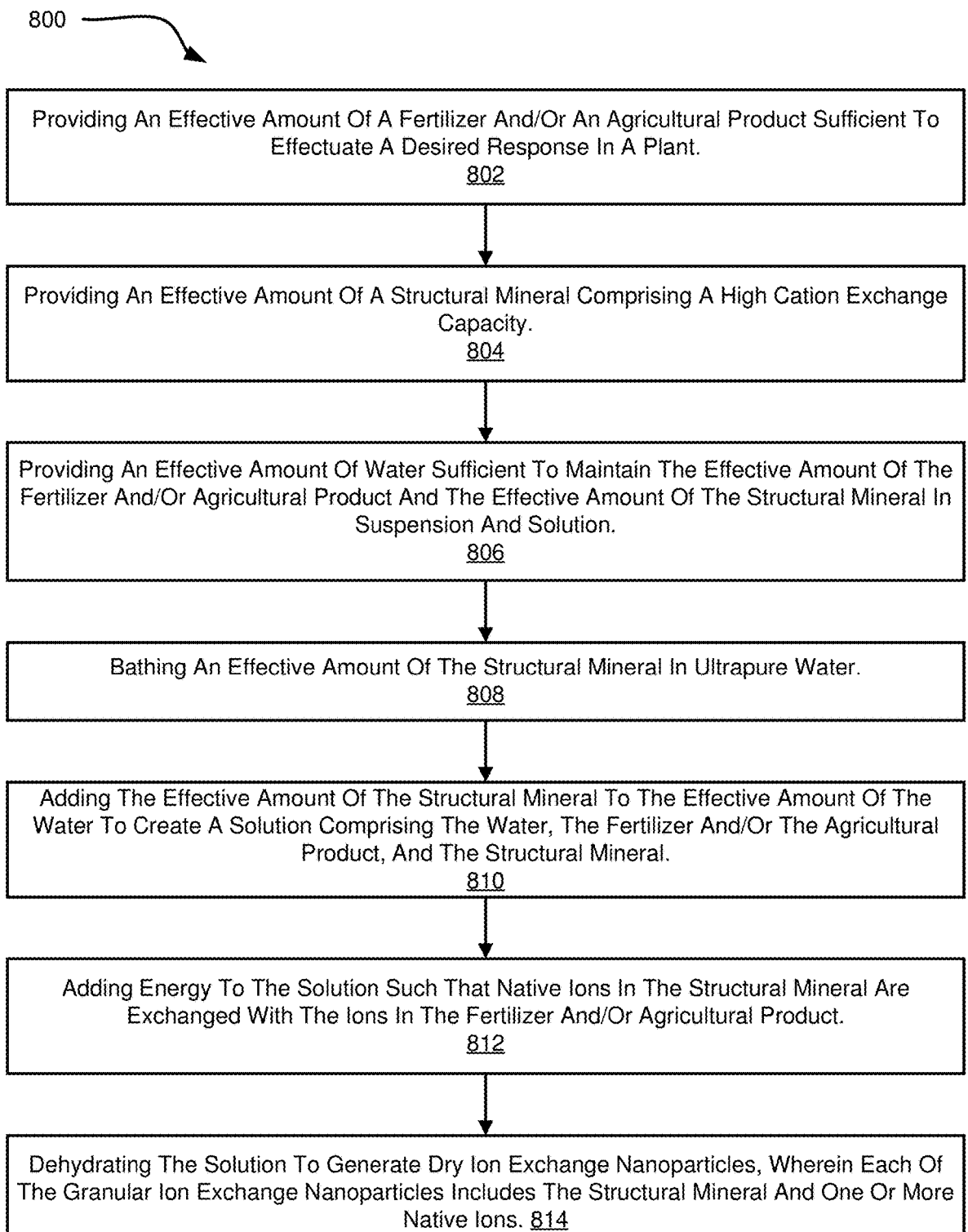

800

Providing An Effective Amount Of A Fertilizer And/Or An Agricultural Product Sufficient To Effectuate A Desired Response In A Plant.
802

Providing An Effective Amount Of A Structural Mineral Comprising A High Cation Exchange Capacity.
804

Providing An Effective Amount Of Water Sufficient To Maintain The Effective Amount Of The Fertilizer And/Or Agricultural Product And The Effective Amount Of The Structural Mineral In Suspension And Solution.
806

Bathing An Effective Amount Of The Structural Mineral In Ultrapure Water.
808

Adding The Effective Amount Of The Structural Mineral To The Effective Amount Of The Water To Create A Solution Comprising The Water, The Fertilizer And/Or The Agricultural Product, And The Structural Mineral.
810

Adding Energy To The Solution Such That Native Ions In The Structural Mineral Are Exchanged With The Ions In The Fertilizer And/Or Agricultural Product.
812

Dehydrating The Solution To Generate Dry Ion Exchange Nanoparticles, Wherein Each Of The Granular Ion Exchange Nanoparticles Includes The Structural Mineral And One Or More Native Ions. 814

FIG. 8

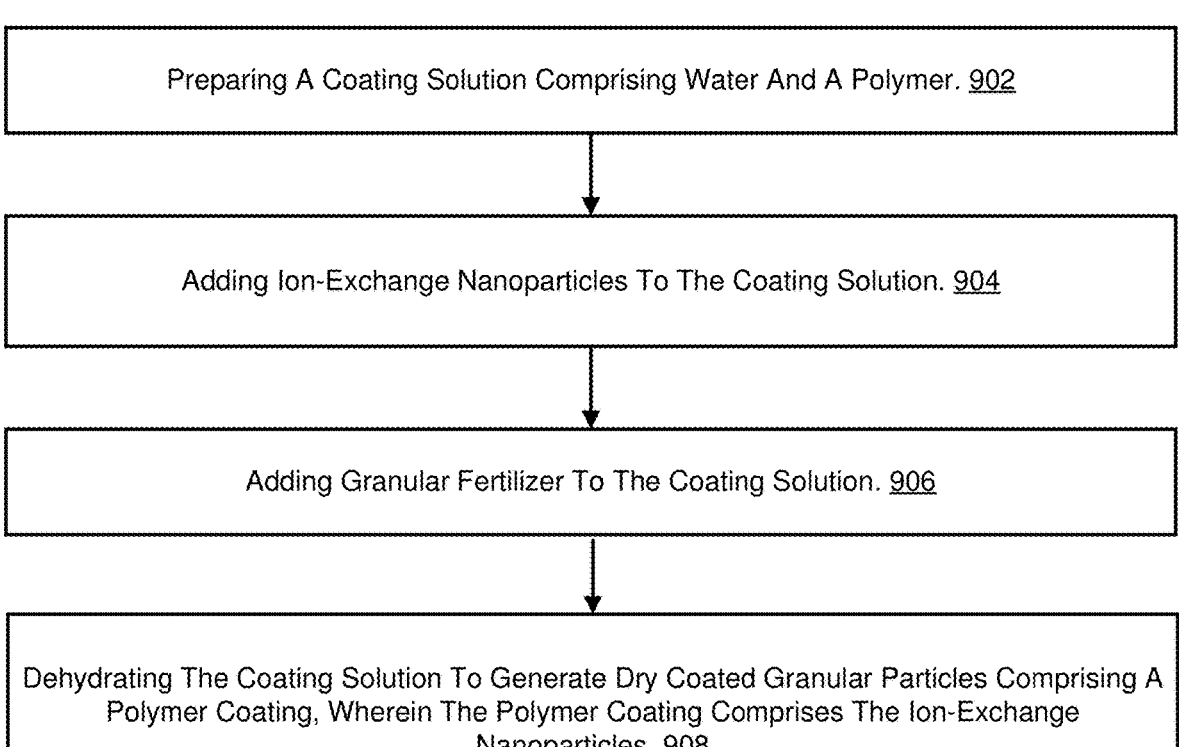
900
Preparing A Coating Solution Comprising Water And A Polymer. 902
Adding Ion-Exchange Nanoparticles To The Coating Solution. 904
Adding Granular Fertilizer To The Coating Solution. 906
Dehydrating The Coating Solution To Generate Dry Coated Granular Particles Comprising A Polymer Coating, Wherein The Polymer Coating Comprises The Ion-Exchange Nanoparticles. 908
FIG. 9

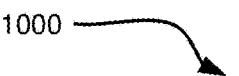
1000
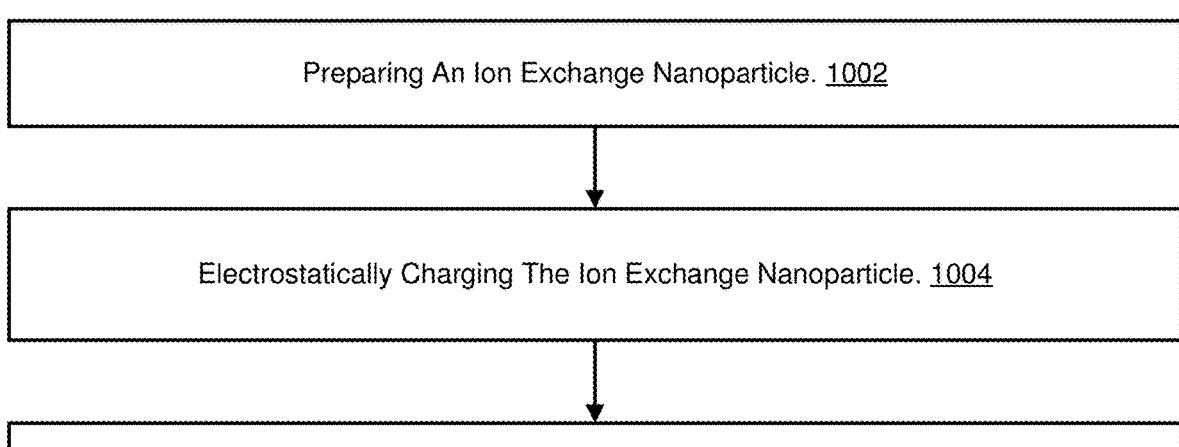
Preparing An Ion Exchange Nanoparticle. 1002
Electrostatically Charging The Ion Exchange Nanoparticle. 1004
Introducing The Electrostatically Charged Ion Exchange Nanoparticle To A Granular Fertilizer Such That The Electrostatically Charged Ion Exchange Nanoparticle Is Attracted To The Granular Fertilizer. 1006
FIG. 10

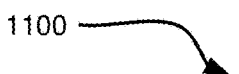

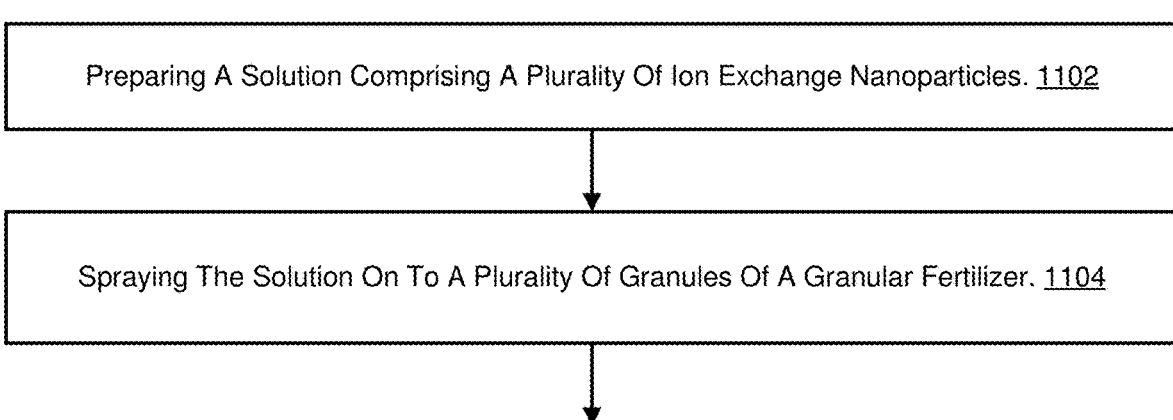

Preparing A Solution Comprising A Plurality Of Ion Exchange Nanoparticles. 1102

Spraying The Solution On To A Plurality Of Granules Of A Granular Fertilizer. 1104

The Granular Fertilizer Comprises A Liquid Loading Potential Such That At Least A Portion Of The Plurality Of Granules Of The Granular Fertilizer Adsorb One Or More Of The Plurality Of Ion Exchange Nanoparticles On To A Surface Of The Granular Fertilizer. 1106

FIG. 11

INCORPORATION OF NANOPARTICLES WITH GRANULAR FERTILIZERS

TECHNICAL FIELD

The disclosure relates generally to methods, systems, and products for accelerating the establishment and growth of plants and other living organisms.

BACKGROUND

The agricultural industry, home-based growers, and other commercial growers commonly use fertilizers and other agricultural products to promote increased plant health and plant growth. Fertilizers include natural and synthetic materials that are applied to soil or to plant tissues to supply one or more plant nutrients essential to the growth of plants.

In many cases, it is desirable to store, transport, and apply fertilizers in a dry granular form. However, granular fertilizers are prone to breakage and degradation when moved through heavy equipment and jostled repeatedly. Thus, granular fertilizers experience a relatively short degradation period when used for commercial farming applications. Additionally, in many cases, it is desirable to apply multiple fertilizers and other agricultural products in a single application. Specifically, in some implementations, it is desirable to include a wetting agent or other compound configured to improve soil water retention when also applying fertilizers to the soil.

However, traditional fertilization systems and composition do not provide an effective means to introduce delayed release of fertilizer compositions through synthetic nanoparticles, in combination with dry granular fertilizers. In view of the foregoing deficiencies in current fertilization methods, disclosed herein are compositions, methods, and systems for incorporating nanoparticles with granular fertilizers.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIG. 5 is a schematic illustration of a method for preparing a fertilizer composition including granular fertilizers and dehydrated nanoparticles;

FIG. 6 is a schematic illustration of a perspective view of a coated particle with a portion of a coating cut away to reveal an inner particle disposed therein;

FIG. 8 is a schematic flow chart diagram of a method for manufacturing an ion exchange nanoparticle;

FIG. 9 is a schematic flow chart diagram of a method for manufacturing a coated particle;

FIG. 10 is a schematic flow chart diagram of a method for manufacturing a fertilizer composition including granular fertilizer and ion exchange nanoparticles; and FIG. 11 is a schematic flow chart diagram of a method for manufacturing a fertilizer composition including granular fertilizer and ion exchange nanoparticles.

DETAILED DESCRIPTION

Figure 1:
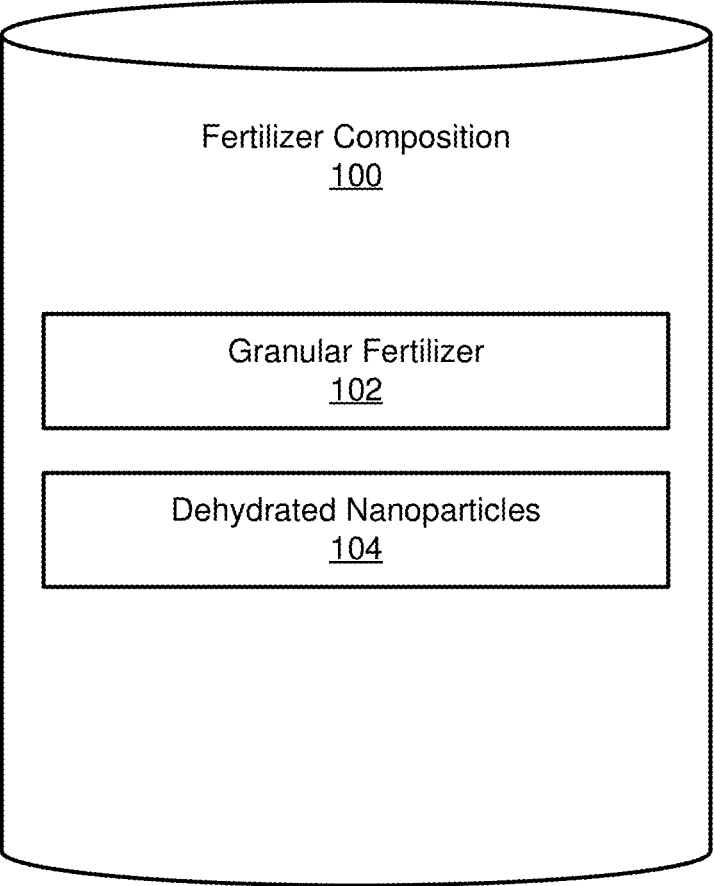
FIG. 1 is a schematic illustration of an example fertilizer composition including granular fertilizers and dehydrated nanoparticles.

Disclosed herein are compositions, methods, and systems for efficient delivery of agricultural products for accelerating the establishment and growth of plants and other living organisms. Specifically disclosed herein are fertilizer compositions including granular fertilizers and ion exchange nanoparticles. The fertilizer compositions described herein enable enhanced uptake of nutritional compounds by plants, and further enable delayed and quick release of fertilizer ions.

For the purposes of promoting an understanding of the principles in accordance with the disclosure, reference will now be made to the implementations and embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

This disclosure is not limited to the configurations, process steps, ingredients, and materials disclosed herein as such configurations, process steps, ingredients, and materials may vary somewhat. The terminology employed herein is used for the purpose of describing embodiments and implementations only and is not intended to be limiting since the scope of the disclosure will be limited only by the appended claims, if any, and equivalents thereof.

In describing and claiming the subject matter of the disclosure, the following terminology will be used in accordance with the definitions set out below.

It must be noted that, as used in this specification and the appended claims, if any, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "synthetic" includes "wholly synthetic" compounds, solutions, and substances and "partially synthetic" compounds, solutions, and substances. A wholly synthetic compound, solution, or substance is entirely generated or synthesized in a laboratory, whereas a partially synthetic compound, solution or substance is chemically altered from its natural or native state. By way of example, a wholly synthetic structural particle may be a crystalline structure that is generated or synthesized in a laboratory setting from non-crystalline molecules and ions. By way of further example, a partially synthetic structural particle may be a crystalline structure that is a native mineral that has been chemically altered in a laboratory. It will be appreciated that the laboratory may be a mobile laboratory or a stationary factory or laboratory without departing from the scope of the disclosure.

As used herein, the phrase "agricultural products" refers broadly to molecules, ions, compounds, solutions, and substances used to protect plants, such as pesticides, molecules, ions, compounds, solutions, and substances used to kill plants, such as herbicides, and molecules, ions, compounds, solutions, and substances used as plant growth regulators, such as those used to promote plant health, fruiting, growth, or those used to slow plant growth.

As used herein, "nanoparticle" or "nanoparticle size" includes an average compound or element size having a diameter in any one dimension that is 100 nanometers or less. As used herein, "submicron particle" or "submicron particle size" includes an average compound or element size having a diameter in any one dimension that is within a range of about 101 nanometers to about 1000 nanometers.

As used herein, "effective amount" means an amount of a component of a fertilizer, an agricultural product, or other compound or element sufficient to provide nutrition to a plant, or sufficient to effectuate the desired response and performance, including killing a plant or undesirable organism, at a reasonable benefit/risk ratio attending any agricultural product, compound and/or composition. For example, an effective amount of a fertilizer compound is an amount sufficient to promote the optimal or desired maturation of plants. An effective amount of a phyllosilicate or tectosilicate or a structural particle having a high ion exchange capacity is an amount sufficient to deliver an effective amount of fertilizer or agricultural product through exchange of native ions on the mineral particles with selected ions/molecules of an agricultural product such as fertilizer. Further, the effective amount of the phyllosilicate or tectosilicate or structural particle must be sufficient to hold and deliver enough selected ions and molecules in an agricultural product to result in promoting the optimal or desired maturation of plants. In an implementation, depending upon the desired ion of an agricultural product to be delivered to the plant cell, the quantity of ions may be more than two orders of magnitude and up to, and including, seven orders of magnitude more than available ion exchange sites within the phyllosilicate or tectosilicate structural particle. It will be appreciated that selected ions, such as fertilizer or agricultural product, may be present without departing from the scope of the disclosure.

It will be understood that matching fertilizer and/or agricultural product type and application rates to satisfy a plant's need is an essential component of optimizing plant production. However, different plants in different soil environments, each having different soil types and pHs and other environmental factors, will require varying rates of the major fertilizer nutrients, which include nitrogen (N), phosphate ($P_2O_5$), and potassium (potash, $K_2O$). Plants also require secondary nutrients, including Sulphur (S), Calcium (Ca), and Magnesium (Mg), though in lesser quantities than the primary nutrients. Micronutrients are also considered essential though they are needed in still lesser quantities. Micronutrients include Chlorine (Cl), Manganese (Mn), Iron (Fe), Zinc (Zn), Copper (Cu), Molybdenum (Mo), and Nickel (Ni). Another element that is not considered essential but is beneficial is Silicon (Si). Thus, due to variations in soil types, soil test nutrient levels, and nutrient ranges of different plants, different fertilizers, agricultural products, and application rates may be required. Still further, the methods, compositions and agricultural products disclosed herein may further affect the application rates, such that less fertilizer and/or agricultural product may be used to effectuate a response in or deliver the desired result to a plant. In any case, to optimize plant production, a plant's need for nitrogen, phosphate, and potassium (sometimes abbreviated to N—P—K) nutrients along with the other essential and beneficial nutrients must be met without over application. Thus, it will be appreciated that the disclosure may utilize any of these nutrients in any number of possible blends of fertilizer and/or agricultural product types to give the correct N—P—K and other nutrient ratio for a given plant or plant. It should also be understood that ions and molecules listed above along with other elements, ions, and molecules may be used to kill or limit growth in plant material or other organisms such as insects, bacteria, fungi, viruses, and other organisms by altering the dosage such that it is toxic to those organisms. For example, Manganese levels of 25 to 200 ppm in citrus leaf tissues are considered adequate while levels above 1000 ppm may result in toxicity. In an implementation, the form of the fertilizer is a liquid fertilizer or combination of fertilizer and other beneficial molecules that promote plant health and growth in a liquid form. It will be understood that in an embodiment the effective amount of liquid fertilizer may fall within a range of about 0.10 gallons to about 250 gallons per 250 gallons of finished liquid product without departing from the scope of the disclosure. In an embodiment, for dry, water-soluble products, the dry product may fall within a range of about 0.01 pounds to 1000 pounds per 250 gallons of finished liquid product.

Referring now to the figures, FIG. 1 is a schematic illustration of a fertilizer composition 100 for accelerating the establishment and growth of plants and other living organisms. The fertilizer composition 100 described herein enables improved plant uptake of fertilizer ions and increased efficiency in fertilizer application, when compared with traditional dry fertilizers. The fertilizer composition 100 includes a granular fertilizer 102 and dehydrated nanoparticles 104. The dehydrated nanoparticles 104 may specifically include synthetic ion exchange nanoparticles as described herein.

The granular fertilizer 102 may include a mixture of one or more fertilizer ions or other agricultural products. Specifically, the granular fertilizer 102 is configured as an agricultural product comprising one or more of a fertilizer, pesticide, fungicide, weed killer, herbicide, microbe, plant growth regulator, and so forth. The granular fertilizer 102 may be applied to soil in its dry granular state, or when the fertilizer composition 100 has been dissolved in water. The granular fertilizer 102 may include organic fertilizers or inorganic fertilizers. The organic fertilizers include nutrients derived from plants or animals, such as agricultural waste, animal waste, household waste, industrial waste, minerals, or sludge. The inorganic fertilizers include chemical fertilizers containing nutrients for improving the growth of plants. The inorganic fertilizers may include nitrogenous fertilizers, phosphate fertilizers, potassium fertilizers, compound fertilizers, or complete fertilizers.

The granular fertilizer 102 may include one or more nitrogenous fertilizers. Nitrogen fertilizers contain nitrogen necessary for crop growth. Nitrogen is a main component of chlorophyll, which maintains balance during photosynthesis. Nitrogen is also part of plant amino acids and forms proteins, and thus, the use of a nitrogenous fertilizer improves the yield and quality of agricultural products. The nitrogenous fertilizers included within the granular fertilizer 102 may include nitrate, ammonia, and ammonium salts. Specifically, the nitrogenous fertilizers may include one or more of sodium nitrate, ammonium sulfate, ammonium nitrate (AN), ammonium sulphate nitrate, ammonium chloride, urea, urea ammonium nitrate (UAN), calcium nitrate, Chilean nitrate, anhydrous ammonia, or calcium ammonium nitrate (CAN).

The granular fertilizer 102 may include one or more phosphate fertilizers. Phosphorous is found in the protoplasm of a plant cell and plays a role in cell growth and proliferation. Thus, phosphorous is beneficial for the growth of plant roots. Phosphorous fertilizers present within the granular fertilizer 102 may include one or more of single superphosphate (SSP), triple superphosphate (TSP), monoammonium phosphate (MAP), di-ammonium phosphate (DSP), or ammonium polyphosphate.

The granular fertilizer 102 may include one or more potassium fertilizers. Potassium fertilizers may specifically be selected to be applied to soils deficient in potash. Potassium fertilizers may include muriate of potash (potassium chloride) or sulphate of potash (potassium sulphate). Muriate of potash is a crystalline material including potash ($K_2O$). Sulphate of potash dissolves readily in water and also includes potash ($K_2O$).

The granular fertilizer 102 may include one or more secondary plant nutrients, such as calcium, magnesium, or sulfur. Sulphur may be added to nitrogenous fertilizers such as ammonium nitrate or urea. Other sulfur sources include single superphosphate (SSP). Potassium sulphate (SOP), and potassium magnesium sulphate (Kainite). Magnesium may be supplied in the form of Kieserite, which is a magnesium sulphate mineral used in agriculture to correct magnesium deficiencies. Calcium may be included within the granular fertilizer 102 in the form of calcium nitrate, gypsum (calcium sulphate), or lime/dolomite (calcium carbonate).

The granular fertilizer 102 may include one or more micronutrient fertilizers such as iron, manganese, boron, zinc, and copper. The granular fertilizer 102 may additionally include one or more inhibitors, such as nitrification inhibitors that delay the nitrification of ammonium by suppressing the activity of *Nitrosomonas* bacteria in the soil. The granular fertilizer 102 may additionally include urease inhibitors which include chemical compounds configured to delay the first step of degradation of urea in the soil, which include the hydrolysis that creates $NH_3$ emissions.

The granular fertilizer 102 may include one or more compound fertilizers, which include two or more plant nutrients that are delivered to the plant simultaneously. For example, when soil is deficient in both nitrogen and phosphorous, the granular fertilizer 102 may include a compound fertilizer such as amorphous to deliver nitrogen and phosphate simultaneously. Specifically, the granular fertilizer 102 may include a "complete fertilizer" including nitrogen, phosphorous, and potassium.

The granular fertilizer 102 may include a combination of fertilizers and one or more of insecticides, fungicides, or weed killers. The granular fertilizer 102 may specifically include weed killers such as DDT (dichlorodiphenyltrichloroethane), BHT, mercury salts, copper salts, or 2,4-D.

The granular fertilizer 102 may additionally include one or more plant growth regulators (PGRs). Plant growth regulators include chemicals used to modify plant growth, such as increasing branching, suppressing shoot growth, increasing return bloom, removing excess fruit, altering fruit maturity, and so forth. Plant growth regulators that may be included in the granular fertilizer 102 may include auxins, gibberellins, cytokinin, abscisic acid, and ethylene.

Figure 2:
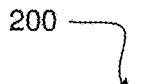
FIG. 2 is a schematic illustration of a nanoparticle including a structural particle and a plurality of selected ions.

FIG. 2 is a perspective view of a schematic illustration of an ion exchange nanoparticle 200. The ion exchange nanoparticle 200 described in FIG. 2 may be desiccated to its dehydrated form (see dehydrated nanoparticles 104), and then combined with the granular fertilizer 102 to form the fertilizer composition 100. The ion exchange nanoparticle 200 includes a structural particle 202 arranged in a crystalline structure as illustrated in FIG. 2 or some other multiple-particle structure. The ion exchange nanoparticle 200 further includes a plurality of native ions 206 to be exchanged with a plurality of selected ions 204.

The structural particle 202 may include, for example, clay, zeolite, or another mineral. The structural particle 202 includes a plurality of cation exchange sites and may have a high cation exchange capacity (CEC). The structural particle 202 is deemed to have a high cation exchange capacity if the structural particle 202 comprises 10 centimoles of charge per kilogram (cmolc/kg) or more available for exchange. The structural particle 202 includes one or more native ions 206 that are attracted to the cation exchange sites. The structural particle 202 is processed to synthesize the ion exchange nanoparticle 200 by causing the one or more native ions 206 to exchange with one or more selected ions 204. The one or more selected ions 204 may include suitable fertilizer ions or agricultural product ions, including those discussed in connection with FIG. 1. After processing, the ion exchange nanoparticle 200 includes a shell formed by the structural particle 202 and further includes a plurality of selected ions 204 attracted to the cation exchange sites formed by the structural particle 202. In a perfect implementation, each of the native ions 206 is exchanged with a known ion 204.

The ion exchange nanoparticle 200 is applied to plants and enables improved uptake of fertilizer and/or agricultural products by the plants when compared with traditional methods. The structural particle 202 of the ion exchange nanoparticle 200 enables the plants to absorb the fertilizer ions more efficiently and thereby increases the effectiveness of fertilizing the plants.

The ion exchange nanoparticle 200 can pass through a plant's cell walls and be absorbed by the plant. The ion exchange nanoparticle 200 increases the absorption of the one or more selected ions 204 that have taken the place of the one or more native ions 206 attracted to the structural particle 202, and this enables the ion exchange nanoparticle 200 to deliver the one or more selected ions 204 to the plant. The structure of the ion exchange nanoparticle 200 can enter the plant cells and deliver each of the unique fertilizer ions to the plant and increase the plant's fertilizer uptake of the delivered fertilizer ions.

Ion exchange (cation exchange or anion exchange) is a chemical process where ions are exchanged between two electrolytes or between an electrolyte solution and a complex. This process includes both cations (ions with a positive charge) and anions (ions with a negative charge). Ion exchangers (complexes) can include synthetic gel polymers or natural substances. It will be appreciated that the structural particle 202 of the disclosure is the complex. Ion exchange on a complex occurs when preexisting ions on a complex are released in exchange for the binding of ions that have a higher affinity for the complex. This process can be reversed by introducing a saturated solution of the lower affinity ions to the complex.

The structural particle 202 may be in the consolidated or aggregate form. In an implementation, the structural particle 202 is a zeolite of the zeolite group in the tectosilicate family and can be naturally occurring or synthetically derived. Zeolites are crystalline, hydrated aluminosilicates that contain alkali and alkaline-earth metals. Their crystal framework is based upon a three-dimensional network of $SiO_4$ tetrahedra with all four oxygens shared by an adjacent tetrahedral. The alkali and alkaline earth cations are loosely bound within this structure (by ionic bonding) and can be exchanged by other cations or molecular water. Most zeolites can be dehydrated and rehydrated without any change in volume. The important physical and chemical properties of zeolites are high degree of hydration, low density and large void volume when dehydrated, cation exchange properties, uniform molecular-sized channels in the dehydrated crystals, ability to adsorb gases and vapors, and catalytic properties.

Figure 3:
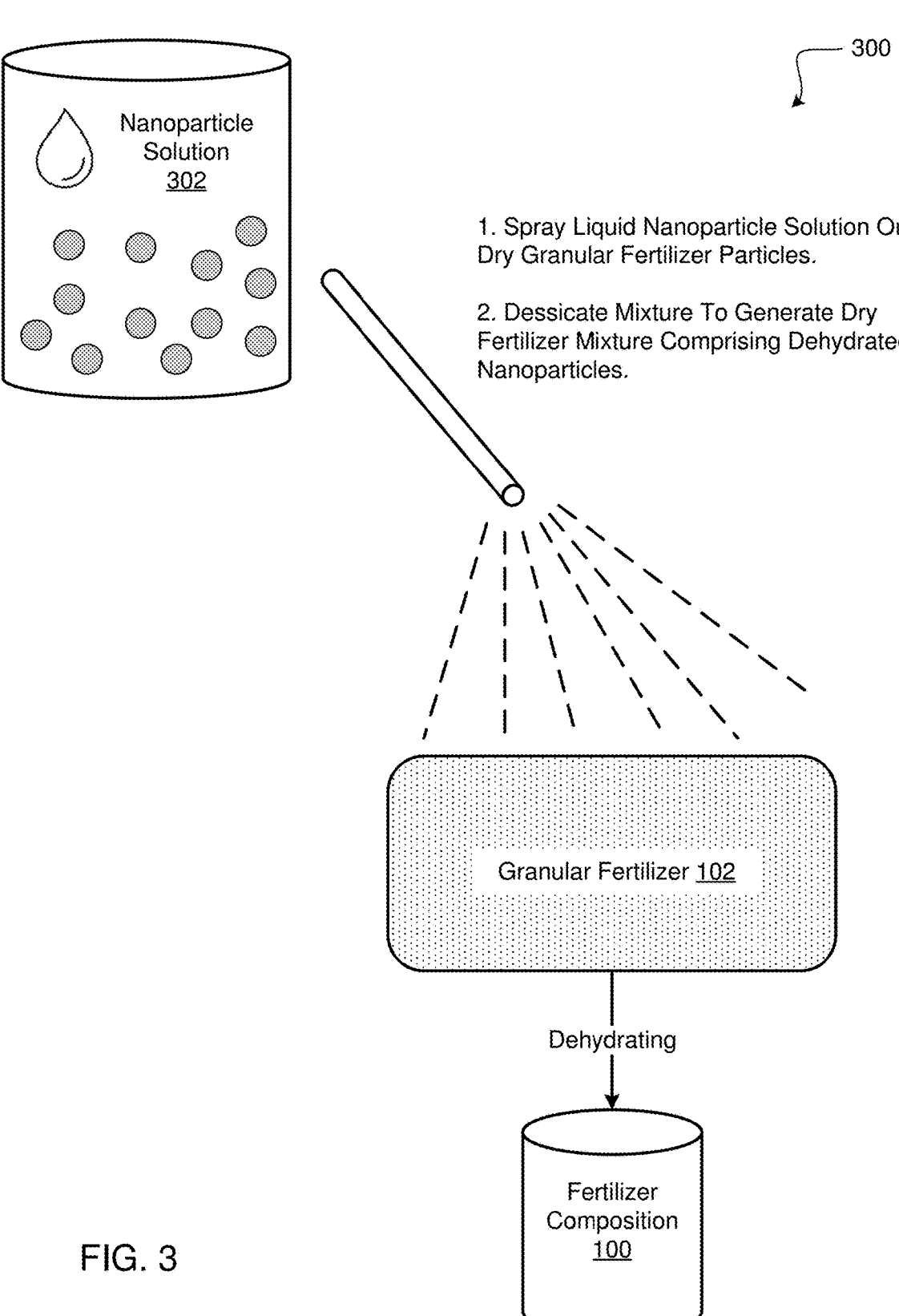
FIG. 3 is a schematic illustration of a method for preparing a fertilizer composition including granular fertilizers and dehydrated nanoparticles.

FIG. 3 is a schematic illustration of a method 300 for preparing the fertilizer composition 100. The fertilizer composition 100 may be presented in a dry granular form, such that the dry granular form is scattered or distributed across a soil material for uptake by plants. In an implementation, the method 300 of manufacturing the fertilizer composition 100 includes spraying a liquid nanoparticle solution 302 on to the granular fertilizer 102, as shown in FIG. 3.

The ion exchange nanoparticle 200 described in connection with FIG. 2 is prepared in water and may specifically be prepared in ultrapure water. After the ion exchange nanoparticle 200 is prepared, it may be stored in a liquid solution form such as the nanoparticle solution 302. Then, the nanoparticle solution 302 may be directly sprayed on to dry granular fertilizer 102. The wetted granular fertilizer 102 is then dehydrated to generate the fertilizer composition 100 including the granular fertilizer 102 and the dehydrated nanoparticles 104.

The wetted granular fertilizer may be dehydrated using a desiccating agent such as a hydrophilic dry substance like fumed silica. The wetted granular fertilizer may be dehydrated using any suitable desiccating means, including acid catalysis.

Figure 4:
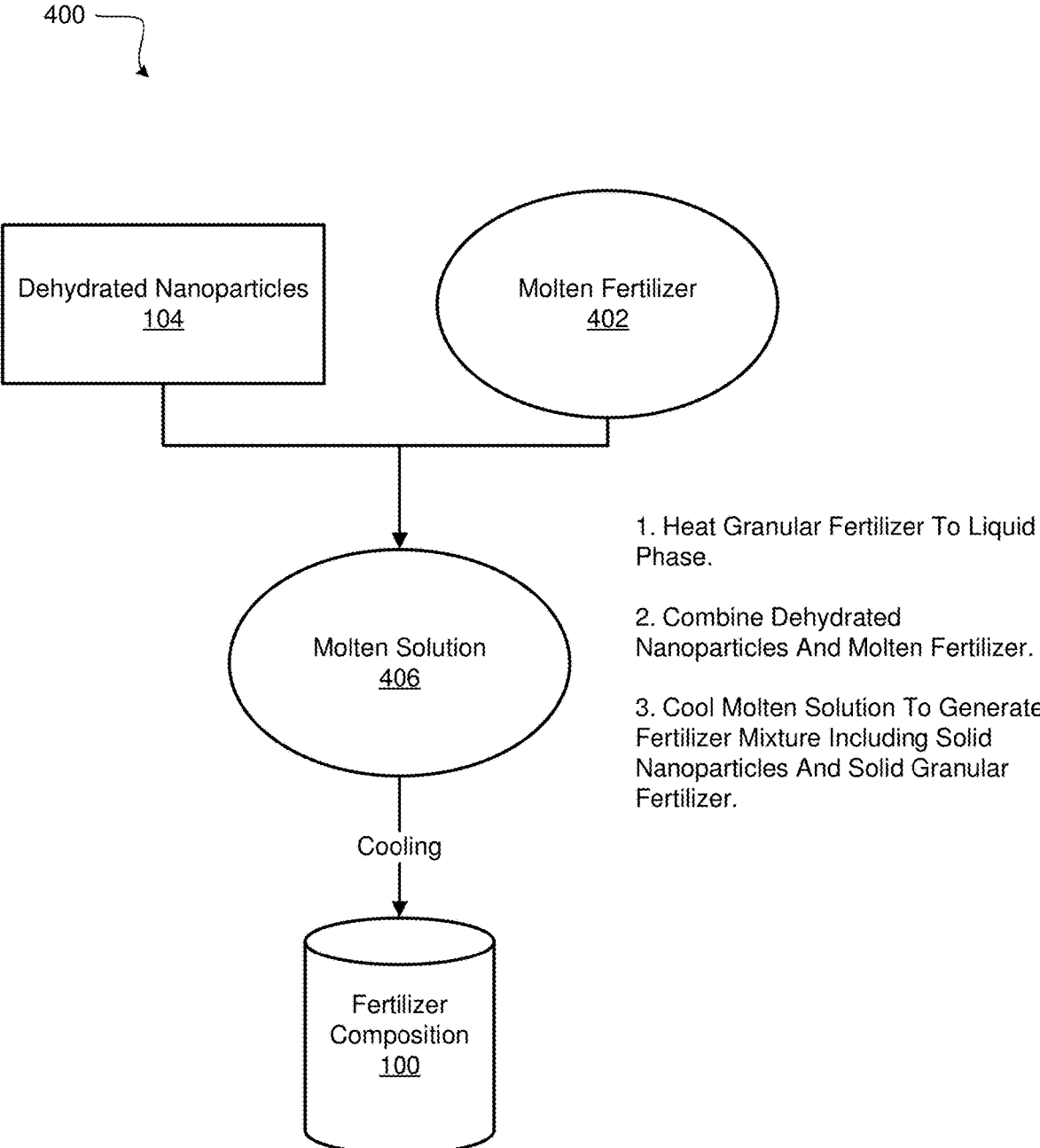
FIG. 4 is a schematic illustration of a method for preparing a fertilizer composition including granular fertilizers and dehydrated nanoparticles.

FIG. 4 is a schematic illustration of a method 400 for preparing the fertilizer composition 100. The method 400 includes heating the granular fertilizer 102 to generate a molten fertilizer 402. The dehydrated nanoparticles 104 are introduced to the molten fertilizer 402 to generate a molten solution 406. The molten solution 406 is cooled to generate the solid fertilizer composition 100 including the granular fertilizer 102 and the dehydrated nanoparticles 104.

The process of heating the granular fertilizer 102 will be optimized and adjusted depending on the types of compounds present within the granular fertilizer 102. In some cases, for example, the granular fertilizer 102 includes urea and must be heated at least to 133° C. to convert the granular fertilizer 102 to a liquid phase. The granular fertilizer 102 may then be continuously heated to ensure the granular fertilizer 102 remains in the liquid phase. The granular fertilizer 102 may be heated in any suitable reaction vessel and may specifically be heated using radiation and/or conduction heat. In some cases, it is undesirable to heat the granular fertilizer 102 using direct heat because this will not yield the desired liquid phase for some fertilizer compositions.

The dehydrated nanoparticles 104 are added to the granular fertilizer 102 when in the liquid phase (molten fertilizer 402). In most cases, gentle agitation is required to prevent sudden cooling of the molten fertilizer 402 in some areas. The molten solution 406 may then be dropped into a cooling tower with constant air movement functioning as a heat exchanger. In some cases, if the temperature is reduced suddenly, then the molten solution 406 will solidify inconsistently, and this can cause certain fertilizer components to solidify in undesirable shapes.

As discussed herein, the ion exchange nanoparticles 200 are typically prepared in water. This water solution is dehydrated using any suitable desiccating means to generate the dehydrated nanoparticles 104. In an implementation, the water solution is desiccated using a hydrophilic dry substance, or by way of acid catalysis.

FIG. 5 is a schematic illustration of a method 500 for preparing the fertilizer composition 100. The method 500 includes preparing the dehydrated nanoparticles 104 and then electrostatically charging the dehydrated nanoparticles 104 to generate electrostatically charged nanoparticles 504. The electrostatically charged nanoparticles 504 are then introduced to the granular fertilizer 102 to generate the fertilizer composition 100. After introduction, the electrostatically charged nanoparticles 504 are attracted to the granular fertilizer 102 and ultimately generate a homogenous mixture of the nanoparticles and the granular fertilizer 102.

In some cases, the electrostatically charged nanoparticles 504 are created by desiccating a solution of aqueous nanoparticles to create a dry material. The resultant aerogel is then completely dried and pulverized into smaller particles sizes. This produce may then be statically charged (with slight attraction). The charged particles may then be applied to the larger granular fertilizer 102.

FIG. 6 is a perspective view of a cutaway illustration of a coated particle 600. The coated particle 600 includes an inner particle 608 comprising granular fertilizer 102. The inner particle 608 is surrounded by a coating 610. The coating 610 is partially cut away in FIG. 1 to reveal the inner particle 608 disposed underneath the coating 610. The coating 610 has a coating thickness 612 which may vary depending on the implementation. The coating 610 comprises the nanoparticles 200, and thus, the coated particle 600 serves as a version of the fertilizer composition 100.

The coated particle 600 may be applied to soil when the coated particle 600 is in a dry granular state, or when the coated particle 600 is dissolved in water. When the coated particle 600 is in contact with water after a wetting event, such as rainfall or irrigation, the coating 610 degrades, and the granular fertilizer 102 disposed therein is released into the soil and made available for uptake by a plant.

The coating 610 serves as an inclusion vessel that protects the inner particle 608. The coating 102 includes a flexible polymer having the ion exchange nanoparticle 200 incorporated throughout. Additionally, the coating 610 improves the structural and mechanical robustness of the granular fertilizer 102. The coating 610 serves to protect the granular fertilizer 102 to ensure it can survive vigorous movements during manufacturing, transport, and application.

The coating 610 includes a polymer coating with the nanoparticles 200 distributed throughout. The polymer is selected to serve as an effective carrier for the inner particle 608. This polymer may include any polymer that may be used as a coating as described herein, and may specifically include a reverse block copolymer, block copolymer, branched polymer, or other type of polymer suitable for the application. Thus, the granular fertilizer 102 particles making up the inner particle 608 are coated by the nanoparticles 200. This improves overall fertilizer uptake by the plant and increases the efficiency of fertilizer application.

As discussed above, the polymer may be selected from a class consisting of block copolymers. Block copolymers comprise two or more homopolymer subunits linked by covalent bonds. Additionally, the polymer may be selected from a class consisting of branched polymers or branched chain polymers. Branched polymers include side chains or branches growing from a main chain. Branched polymers include graft polymers, star-shaped polymers, comb polymers, brush polymers, polymer networks, and dendrimers. Branched polymers include starch, glycogen, and low-density polyethylene.

In some cases, the coating 610 molecules are attracted to at least a portion of the granular fertilizer 102 particles making up the inner particle 608. The coating 102 may be attracted to components of the inner particle 608 through one or more of van der Waals forces, quantum attraction, or London dispersion forces. During manufacturing, the inner particle 608 molecules and the coating 610 molecules enter chemical equilibrium and become thermodynamically stable in the coated particle 600 configuration. In some cases, the ratio of inner particle 608 molecules and coating 610 molecules is optimized to ensure thermodynamic stability of the coated particle 600.

The coating thickness 612 is variable depending on the implementation and may be optimized depending on one or more of the type of inner particle 608 disposed within the coating 610, the agricultural use of the coated particle 600, the desired degradation time for the coated particle 600, and so forth. The coating thickness 612 will vary depending on the types of polymers selected for the coating 610. The coating thickness 612 may be increased when the coated particle 600 is expected to undergo extensive mechanical or physical manipulation, for example, when being transported, tumbled, or applied to soil. The coated particle 600 may be transported on conveyer belts, tumbled during manufacture, transported in trucks, distributed to soil through heavy duty mixers, and so forth. The coating thickness 612 may be optimized to provide increased rigidity and mechanical strength to withstand this mechanical agitation.

Figure 7:
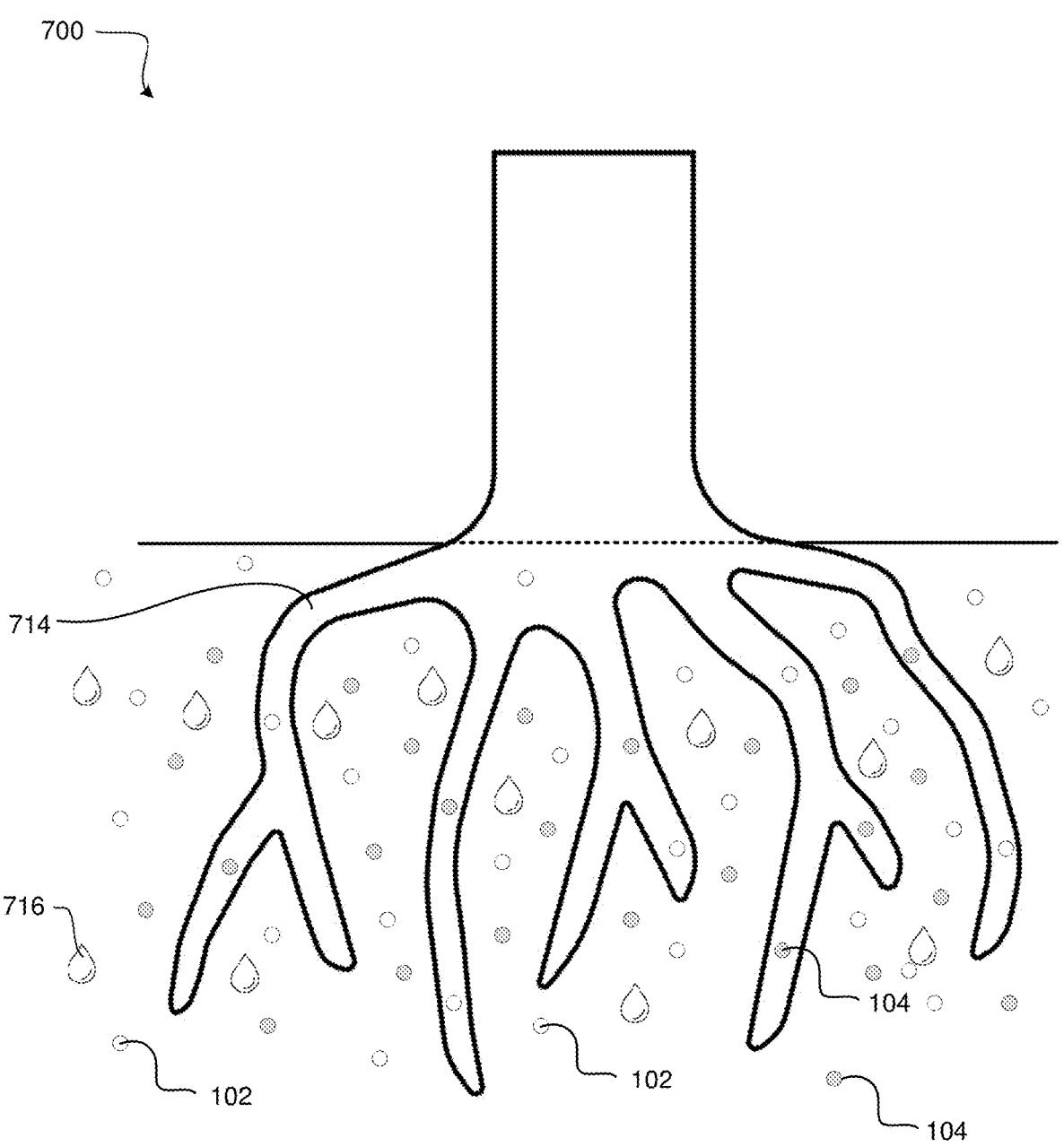
FIG. 7 is a schematic illustration depicting soil composition and a plant root system after applying a fertilizer composition as described herein.

FIG. 7 is a schematic illustration depicting soil chemistry and a plant 714 root network after applying components of a fertilizer composition 100 as described herein. The fertilizer composition 100 may be stored and applied in a dry granular form. After the fertilizer composition 100 is applied, the fertilizer composition 100 eventually experiences its first wetting event, which may include natural precipitation, irrigation wetting, and so forth. When the fertilizer composition 100 undergoes a wetting event, the components will naturally distribute throughout the soil and may be taken up by the plant 714. The components of the fertilizer composition 100 include the granular fertilizer 102 and the dehydrated nanoparticles 104.

In the schematic illustration depicted in FIG. 7, the granular fertilizer 102 particles are illustrated with white dots and the dehydrated nanoparticles 104 are illustrated with grey dots. As shown in FIG. 7, each of the granular fertilizer 102 and the dehydrated nanoparticles 104 are dispersed throughout the soil.

The plant 714 takes up at least a portion the dehydrated nanoparticles 104 by way of its root system. The structure of the ion exchange nanoparticle 200 enables delayed release of the selected ions 204 over time to improve plant outcomes and reduce the total quantity of fertilizer needed to effectuate a desired result in the plant 714. The ion exchange nanoparticle 200 does not bind to the soil and remains in solution when dispersed throughout the soil. This enables the ion exchange nanoparticle 200 to be readily absorbed by the root system of the plant 714 as the plant absorbs water 716. The ion exchange nanoparticle 200 can pass through the cell walls of the plant and thereby deliver the fertilizer ions (selected ions 204) to the plant. This provides increased fertilizer uptake when compared with conventional methods.

FIG. 8 is a schematic flow chart diagram of a method 800 for producing a synthetic agricultural product such as dehydrated nanoparticles 104 as described herein. The method 800 includes providing at 802 an effective amount of a fertilizer and/or an agricultural product sufficient to effectuate a desired response in a plant. The method 800 includes providing at 804 an effective amount of a structural particle 202 comprising a high cation exchange capacity. The method 800 includes providing at 806 an effective amount of water sufficient to maintain the effective amount of the fertilizer and/or agricultural product and the effective amount of the structural particle 202 in suspension and solution. The method 800 includes bathing at 808 an effective amount of the structural particle 202 in ultrapure water. The method 800 includes adding at 810 the effective amount of the structural particle 202 to the effective amount of the water to create a solution comprising the water, the fertilizer and/or the agricultural product, and the structural particle 202. The method 800 includes adding at 812 energy to the solution such that the native ions 206 in the structural particle 202 are exchanged with the ions in the fertilizer and/or agricultural product. The method 800 includes dehydrating at 814 the solution to generate dry ion exchange nanoparticles 200. Each of the dry ion exchange nanoparticles 200 includes the structural mineral and one or more of the native ions 206. The resultant dry ion exchange nanoparticle 200 may then be used a component of the dehydrated nanoparticles 104 as described herein.

The method 800 of generating the dry ion exchange nanoparticle 200 may include providing an effective amount of a structural particle 202 that comprises a high cation exchange capacity. Cation exchange capacity may be determined by calculating a value that is an estimate of a substance's ability to attract, retain, and exchange cation elements. Cation exchange capacity is reported in milliequivalents (meq) per 100 grams of a substance, which may be a soil substance, structural particle 202, or other inorganic matter (meq/100 g). A meq is the number of ions that total a specific quantity of electrical charges. For example, a meq of potassium ($K^+$) ions is approximately $6 \times 10^{20}$ positive charges; whereas with calcium a meq of Calcium ($Ca^{++}$) is also $6 \times 10^{20}$ positive charges, but only $3 \times 10^{20}$ ions because each calcium ion has two positive charges. Although the minerals discussed here have high cation exchange capacity values, they do have a level of anion exchange capacity as well and the anion exchange can be utilized in the same way as the cation exchange. The number of cations supplied by the fertilizer and/or agricultural product source should outnumber the number of cations occurring naturally on the structural particle 202, such that the probability for the native ion being exchanged for a fertilizer and/or agricultural product cation is high, and the probability of the original cation being reintroduced onto the structural particle 202 is extremely low. Since most fertilizers and/or agricultural products applied in an agricultural or horticultural setting are often a mixture of two or more primary, secondary, and micro nutrients, and that the combinations are many and varied, it is difficult to describe all of the possibilities, but the ions (both positive and negative) supplied by the fertilizer and/or agricultural product may be at least two orders and may be equal to or up to seven orders of magnitude more abundant than the ions available for exchange (both positive and negative) natively occurring on the structural particle 202. Exception to this rule may be when the selected ions 204 in the fertilizer and/or agricultural product supplied have a single charge (especially positive ions) and have an extremely high affinity for the soil particle—in other words, once the selected ions 204 in the fertilizer and/or agricultural product are exchanged with the native mineral ions the negatively (for example) charged soil particle once ionically bound to the fertilizer and/or agricultural product cation (for example) would represent an extremely low energy state such that exchange is extremely unlikely.

In an implementation, the structural particle 202 may comprise one or more of alumina silicate, silicate, aluminum, sodium aluminosilicate or other tuff material. In an implementation, the structural particle 202 comprises one or more of montmorillonite, illite, kaolinite, smectite, zeolite, hydrated sodium calcium aluminosilicate (HSCAS), and vermiculite. In an implementation, the structural particle 202 comprises smectite. In an implementation, the structural particle 202 comprises zeolite. In an implementation, the zeolite structural particle 202 is a carrier of nutrients and other small organic and inorganic molecules via ion exchange and adsorption inside the channels (formed by the crystalline structure). Zeolite channels may carry ions and small molecules used to protect plants, kill plants, or used as plant growth regulators, such as those used to promote plant health, fruiting, growth, or those used to slow plant growth for use by a cell.

Continuing to refer to FIG. 8, the method 800 may further comprise providing an effective amount of water sufficient to effectuate a desired result in a plant and maintain the effective amount of a fertilizer and/or agricultural product and the effective amount of the structural particle 202 in suspension and solution at 806. The effective amount of water may fall within a range of about 0.1 gallon to about 6000 gallons.

The method 800 may further comprise bathing an effective amount of the structural particle 202 in ultrapure water at 808. In an implementation of the method, the step of bathing the effective amount of the structural particle 202 in ultrapure water comprises bathing the structural particle 202 for at least 24 hours. The process of bathing the structural particle 202 may assist in preparing the structural particle 202 by removing native ions 206 and molecules held by water in the channels through diffusion. Ultrapure water may be used to make the ions in the soil substance, structural particle 202, or other organic material readily available for exchange. Thus, when the soil substance, structural particle 202, or other organic material is bathed in ultrapure water, the ions in the structural particle 202 are exposed or otherwise made readily available for ion exchange with another known substance. Thus, in an implementation, the method and system of the disclosure may comprise exchanging cations from the structural particle 202 with selected cations of a known source. For example, in an embodiment, the method 800 comprises bathing an effective amount of the soil substance, the structural particle 202 or other inorganic material directly in the fertilizer or agricultural product. When the soil substance, structural particle 202, or other organic material is bathed in fertilizer or other known or desired source of ions, the ions in the soil substance, structural particle 202, or other organic material are exposed or otherwise made readily available for ion exchange with another known substance.

The method 800 may further comprise heating the structural particle 202 (zeolite) with a heat source to create a dehydrated structural particle 202. In an implementation, the heat source is an oven. In an implementation the heat source is a heat lamp. This step ensures that the zeolite channels are filled with a concentrated fertilizer and/or agricultural product solution. The method 800 shown in FIG. 8 may further comprise creating a pretreated solution by adding the dehydrated structural particle 202 to a concentrated fertilizer and/or agricultural product solution, thus introducing a high concentration of desired ions into the channels and at the ion exchange sites.

FIG. 9 is a schematic flow chart diagram of a method 900 for producing a nanoparticle-coated granular fertilizer as described herein. The method 900 may be implemented to prepare a batch of coated granular fertilizer that may be stored, transported, and applied in a granular state. The coated granular fertilizer described herein may be stored undisturbed for a virtually indefinite amount of time without experiencing degradation. The coated granular fertilizer described herein experiences increased mechanical rigidity and longevity when experiencing physical manipulation during manufacture, transportation, and application.

The method 900 begins with preparing at 902 a coating solution comprising water and a polymer, which may specifically include a water-soluble polymer. The method 900 includes adding at 904 ion-exchange nanoparticles (see 200) to the coating solution. The method 900 includes adding at 906 one or more agricultural particles to the coating solution, and specifically adding granular fertilizer 102 to the coating solution. The one or more agricultural particles may additionally include one or more of an herbicide, pesticides, plant growth regulator, fungicide, weed killer, microbe, or nanoparticle. The method 900 includes dehydrating at 908 the coating solution to generate dry coated granular particles comprising a polymer coating, wherein the polymer coating comprises the ion-exchange nanoparticles.

FIG. 10 is a schematic flow chart diagram of a method 1000 for producing a granular fertilizer composition for enhanced uptake of nutrients and delayed release of fertilizer compounds. The method includes preparing at 1002 an ion exchange nanoparticle, which may be prepared according to any of the methods described herein and including the method 800 discussed in connection with FIG. 8. The method 1000 includes electrostatically charging at 1005 the ion exchange nanoparticle. The method 1000 includes introducing at 1006 the electrostatically charged ion exchange nanoparticle to a granular fertilizer such that the electrostatically charged ion exchange nanoparticle is attracted to the granular fertilizer.

FIG. 11 is a schematic flow chart diagram of a method 1100 for producing a granular fertilizer composition for enhanced uptake of nutrients and delayed release of fertilizer compounds. The method 1100 includes preparing at 1102 an ion exchange nanoparticle, which may be prepared according to any of the methods described herein and including the method 800 discussed in connection with FIG. 8. The method 1100 includes spraying at 1104 the solution on to a plurality of granules of a granular fertilizer. The method 1100 is such that the granular fertilizer comprises a liquid loading potential such that at least a portion of the plurality of granules of the granular fertilizer adsorb one or more of the plurality of ion exchange nanoparticles on to a surface of the granular fertilizer (see 1106).

EXAMPLES

The following examples pertain to further embodiments.

Example 1 is a composition. The composition includes a granular fertilizer and an ion exchange nanoparticle, wherein the ion exchange nanoparticle comprises: a structural particle comprising an ion exchange site; and an ion, wherein the ion is attracted to the structural particle at the ion exchange site.

Example 2 is a composition as in Example 1, further comprising a coating disposed around the granular fertilizer, wherein the ion exchange nanoparticle is a component of the coating.

Example 3 is a composition as in any of Examples 1-2, wherein the coating is disposed around a plurality of granules of the granular fertilizer, and wherein the coating comprises: a polymer; and the ion exchange nanoparticle.

Example 4 is a composition as in any of Examples 1-3, wherein the coating comprises two or more unique polymers comprising: a first polymer comprising water solubility; and a second polymer comprising a block chain copolymer.

Example 5 is a composition as in any of Examples 1-4, wherein the granular fertilizer comprises one or more of a nitrogenous fertilizer, a phosphate fertilizer, or a potassium fertilizer.

Example 6 is a composition as in any of Examples 1-5, wherein the ion exchange nanoparticle comprises: the structural particle, wherein the ion exchange site is one of a plurality of native ion exchange sites; the ion, wherein the ion is one of a plurality of fertilizer ions; wherein at least one of the plurality of fertilizer ions is attached to at least one of the plurality of native ion exchange sites of the structural particle; and wherein the ion exchange nanoparticle causes a delayed release of the plurality of fertilizer ions.

Example 7 is a composition as in any of Examples 1-6, wherein the ion exchange nanoparticle is sprayed on to the granular fertilizer when the ion exchange nanoparticle is dissolved in water.

Example 8 is a composition as in any of Examples 1-7, wherein the ion exchange nanoparticle is adsorbed by the granular fertilizer on a surface of the granular fertilizer.

Examples 9 is a composition as in any of Examples 1-8, wherein the composition is in a desiccated form, and wherein the composition is applied to soil in the desiccated form.

Example 10 is a composition as in any of Examples 1-9, wherein the composition is manufactured by: heating the granular fertilizer to a liquid state to generate molten fertilizer; adding the ion exchange nanoparticle to the molten fertilizer; and cooling the solution comprising the molten fertilizer and the ion exchange nanoparticle back to a solid state.

Example 11 is a composition as in any of Examples 1-10, wherein the granular fertilizer comprises a liquid loading potential such that the granular fertilizer adsorbs the ion exchange nanoparticle.

Example 12 is a composition as in any of Examples 1-11, wherein the composition is manufactured by: electrostatically charging the ion exchange nanoparticle; and introducing the electrostatically charged ion exchange nanoparticle to the granular fertilizer.

Example 13 is a composition as in any of Examples 1-12, wherein the ion exchange nanoparticle is manufactured by generating a solution comprising ultrapure water, the structural particle, and the ion; and wherein the solution is dehydrated prior to introducing the ion exchange nanoparticle to the granular fertilizer.

Example 14 is a composition as in any of Examples 1-13, wherein the ion exchange nanoparticle comprises a plurality of fertilizer ions attracted to a plurality of unique ion exchange sites of the structural particle; and wherein the plurality of fertilizer ions comprises one or more of nitrogen, phosphate, or potassium.

Example 15 is a composition as in any of Examples 1-14, wherein the ion exchange nanoparticle comprises a plurality of fertilizer ions attracted to a plurality of unique ion exchange sites of the structural particle; and wherein the plurality of fertilizer ions comprises one or more of sulfur, calcium, magnesium, chlorine, manganese, iron, zinc, copper, molybdenum, or nickel.

Example 16 is a composition as in any of Examples 1-15, wherein the structural particle is a component of a fine-grained sedimentary rock.

Example 17 is a composition as in any of Examples 1-16, wherein the structural particle is a nanoparticle comprising a particle diameter from about 1 nm to about 1000 nm.

Example 18 is a composition as in any of Examples 1-17, wherein the structural particle comprises a high cation exchange capacity and an equivalents in a range from about 10 milliequivalents per 100 g to about 600 milliequivalents per 100 g.

Example 19 is a composition as in any of Examples 1-18, wherein the ion exchange site of the structural particle is naturally filled with a native ion, and wherein the native ion is exchanged with the ion prior to the ion exchange nanoparticle being combined with the granular fertilizer.

Example 20 is a composition as in any of Examples 1-19, further comprising one or more of an herbicide, a pesticide, a fungicide, or a plant growth regulator.

Example 21 is a method of preparing a coated particle as described herein. The method includes preparing a polymer using hydrolyzed PVA. The PVA polymer is prepared by adding a sufficient amount of PVA to water with vigorous agitation. The method includes applying heat to the PVA solution to complete polymerization and form the PVA polymer. The PVA polymer may be prepared with a concentration of about 2 wt. % to about 10 wt. %.

Example 22 is a method as in Example 21. The method further includes mixing a desiccating agent into the PVA polymer prepared according to Example 1. The method includes mixing this solution vigorously with moderate heat.

Example 23 is a method as in Examples 21-22. The method further includes adding the PVA polymer (may be referred to as the "first polymer") to a copolymer, or another polymer that can be used as a coating 610 for the granular fertilizer 102 (may be referred to as the "second polymer"). The method includes optimizing the ratio of the first polymer to the second polymer based on the masses of the respective polymers. This is calculated based on the mass (g/mL) of each of the first polymer and the second polymer. The first and second polymers are blended together at a roughly 1:1 ratio based on mass. Thus, the volumes of the first polymer and the second polymer may differ depending on the densities of the polymers. The first polymer and the second polymer may be mixed with constant agitation at a temperature of about 30° C.

Example 24 is a method as in Examples 21-23. The method further includes adding the one or more inner particles 102 to the polymer composition prepared in Example 3. The one or more inner particles 102 may include any of the granular fertilizer 102 components described herein, and may specifically include one or more of fertilizers, pesticides, insecticides, plant growth regulators, nanoparticles, microbes, fungicides, and so forth.

Example 25 is a method as in Examples 21-24. The method includes adding the composition prepared in Example 4 to granular fertilizer. The resulting composition including the polymer composition and the granular fertilizer may be prepared such that the polymer composition is present in an amount from about 0.125 wt. % to about 5.0 wt. % the total resultant composition. The resultant composition is prepared while the granular fertilizer is being blended.

Example 26 is a method. The method includes preparing a solution comprising a first polymer and a second polymer. The method includes adding a plurality of fertilizer granules to the solution. The method includes blending the solution until at least a portion of the plurality of fertilizer granules are coated with the first polymer and the second polymer.

Example 27 is a method as in Example 26, further comprising preparing the first polymer by preparing a first polymer solution comprising: water; and a hydrolyzed polyvinyl alcohol; wherein the first polymer solution comprises from about 2 wt. % to about 8 wt. % the polyvinyl alcohol.

Example 28 is a method as in any of Examples 26-27, further comprising adding a desiccating agent to the first polymer solution.

Example 29 is a method as in any of Examples 26-28, wherein adding the desiccating agent to the first polymer solution comprises adding a sufficient amount such that the first polymer solution comprises from about 0.2 wt. % to about 8.0 wt. % the desiccating agent.

Example 30 is a method as in any of Examples 26-29, wherein generating the solution comprises adding the first polymer solution to a second polymer solution, and wherein the first polymer solution comprises from about 2 wt. % to about 25 wt. % the polyvinyl alcohol prior to being added to the second polymer solution.

Example 31 is a method as in any of Examples 26-30, wherein the solution comprises equal parts by weight of the polyvinyl alcohol and the block chain copolymer within a margin of error of about 10%.

Example 32 is a method as in any of Examples 26-31, further comprising adding an agricultural product to the solution, wherein the agricultural product comprises one or more of an herbicide, a pesticide, or a fungicide.

Example 33 is a method as in any of Examples 26-32, further comprising adding an agricultural product to the solution, wherein the agricultural product comprises a weed killer.

Example 34 is a method as in any of Examples 26-33, wherein at least a portion of the plurality of fertilizer granules are disposed within a synthesized nanoparticle comprising: a structural particle comprising an ion exchange site; and the fertilizer granule in a charged state; wherein the ion exchange site of the structural particle is filled with the fertilizer granule in the charged state.

Example 35 is a method as in any of Examples 26-34, wherein at least a portion of the plurality of fertilizer granules are disposed within a synthesized nanoparticle comprising: a structural particle comprising a plurality of native ion exchange sites; and a plurality of the fertilizer granule in a charged state; wherein at least one of the plurality of the fertilizer granule in the charged state is attached to at least one of the plurality of native ion exchange sites of the structural particle; and wherein the nanoparticle causes a delayed release of the plurality of the fertilizer granule in the charged state.

Example 36 is a method as in any of Examples 26-35, wherein the plurality of fertilizer granules comprises one or more of a nitrogenous fertilizer, a phosphate fertilizer, or a potassium fertilizer.

Example 37 is a method as in any of Examples 26-36, wherein adding the plurality of fertilizer granules to the solution comprises adding a sufficient amount such that the solution comprises from about 0.1 wt. % to about 4 wt. % of a combination of the first polymer and the second polymer.

Example 38 is a method as in any of Examples 26-37, further comprising dehydrating the solution to produce a plurality of dry coated fertilizer granules.

Example 39 is a method as in any of Examples 26-38, further comprising applying an effective amount of the plurality of dry coated fertilizer granules to soil to effectuate a desired result in a plant, and further to increase water retention in the soil.

Example 40 is a method as in any of Examples 26-39, wherein the effective amount of the plurality of dry coated fertilizer granules comprises an effective amount of the polyvinyl alcohol to increase the water retention in the soil.

Example 41 is a method as in any of Examples 26-40, wherein the second polymer is polyoxylalkylene.

Example 42 is a method as in any of Examples 26-41, wherein at least a portion of the plurality of fertilizer granules are components of a plurality of mesoporous particles, and wherein the plurality of mesoporous particles comprises pore diameters from about 20 μm to about 80 μm.

Example 43 is a method as in any of Examples 26-42, wherein the second polymer is attracted to at least a portion of the plurality of fertilizer granules by one or more of van der Waals forces, London dispersion forces, or quantum attraction.

Example 44 is a method as in any of Examples 26-43, further comprising optimizing relative quantities of the first polymer, the second polymer, and the plurality of fertilizer granules to form a coating around the plurality of fertilizer granules, wherein the coating comprises the first polymer and the second polymer.

Example 45 is a method as in any of Examples 26-44, wherein the coating degrades upon exposure to water.

Example 46 is a method of preparing a coated particle. The method includes preparing a first polymer solution including water and a first polymer, wherein the first polymer is water soluble. The method includes preparing a second polymer solution including water and a second polymer, wherein the second polymer is a copolymer. The method includes adding the first polymer solution to the second polymer solution to generate a coating solution.

Example 47 is a method as in Example 46, wherein the coating solution comprises from about a 1:1 ratio to about a 1:10 ratio by weight of the first polymer to the second polymer.

Example 48 is a method as in any of Examples 46-47, further comprising adding a plurality of ion exchange nanoparticles to the coating solution.

Example 49 is a method as in any of Examples 46-48, further comprising adding one or more of an herbicide, a pesticide, a fungicide, or a weed killer to the coating solution.

Example 50 is a method as in any of Examples 46-49, further comprising adding a plant growth regulator to the coating solution.

Example 51 is a method as in any of Examples 46-50, further comprising adding a microbe to the coating solution.

Example 52 is a method as in any of Examples 46-51, further comprising adding a plurality of granular fertilizer particles to the coating solution.

Example 53 is a method as in any of Examples 46-52, further comprising dehydrating the coating solution to generate dry coated granular fertilizer particles comprising a two-stage polymer coating.

Example 54 is a method as in any of Examples 46-53, wherein the first polymer is polyvinyl alcohol.

Example 55 is a method as in any of Examples 46-54, wherein the second polymer is a branched polymer.

Example 56 is a method as in any of Examples 46-55, wherein the second polymer is a block copolymer.

Example 57 is a method as in any of Examples 46-56, further comprising adding a desiccating agent to the coating solution.

Example 58 is a method as in any of Examples 46-57, wherein the desiccating agent is hydrophilic fumed silica.

Example 59 is a method. The method includes preparing a coating solution comprising water and a polymer. The method includes adding ion-exchange nanoparticles to the coating solution. The method includes adding granular fertilizer to the coating solution. The method includes dehydrating the coating solution to generate dry coated granular particles comprising a polymer coating, wherein the polymer coating comprises the ion-exchange nanoparticles.

Example 60 is a method. The method includes preparing an ion exchange nanoparticle. The method includes electrostatically charging the ion exchange nanoparticle. The method includes introducing the electrostatically charged ion exchange nanoparticle to a granular fertilizer such that the electrostatically charged ion exchange nanoparticle is attracted to the granular fertilizer.

Example 61 is a method as in Example 60, wherein preparing the ion exchange nanoparticle comprises generating a solution comprising the ion exchange nanoparticle, and wherein the method further includes desiccating the solution comprising the ion exchange nanoparticle.

Example 62 is a method as in any of Examples 60-61, wherein desiccating the solution includes desiccating with a desiccating agent.

Example 63 is a method as in any of Examples 60-62, wherein the desiccating agent is fumed silica.

Example 64 is a method as in any of Examples 60-63, wherein desiccating the solution includes adding a hydrophilic dry substance to the solution comprising the ion exchange nanoparticle.

Example 65 is a method as in any of Examples 60-64, wherein desiccating the solution includes causing an acid catalysis reaction.

Example 66 is a method. The method includes preparing an ion exchange nanoparticle in a solution comprising water. The method includes spraying the solution on to a plurality of granules of a granular fertilizer.

Example 67 is a method as in Example 66, wherein the granular fertilizer comprises a liquid loading potential such that the granular fertilizer adsorbs at least a portion of a plurality of ion exchange nanoparticles within the solution on a surface of the plurality of granules.

In the foregoing Detailed Description of the Disclosure, various features of the disclosure are grouped together in a single implementation or embodiment for the purpose of streamlining the disclosure. This method of disclosure is not to be interpreted as reflecting an intention that the claimed disclosure requires more features than are expressly recited in each claim. Rather, as the following embodiments reflect, inventive aspects lie in less than all features of a single foregoing disclosed embodiment. Thus, the following embodiments are hereby incorporated into this Detailed Description of the Disclosure by this reference, with each embodiment standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, ratios of elements or molecules, function and manner of operation, assembly and use may be made without departing from the principles and concepts set forth herein.

What is claimed is:

1. A composition comprising:
a granular fertilizer; and
a coating disposed around the granular fertilizer, wherein the coating comprises an ion exchange nanoparticle, wherein the ion exchange nanoparticle comprises:
a structural particle comprising an ion exchange site; and
an ion, wherein the ion is attracted to the structural particle at the ion exchange site.

2. The composition of claim 1, wherein the coating is disposed around a plurality of granules of the granular fertilizer, and wherein the coating comprises:
a polymer; and
the ion exchange nanoparticle.

3. The composition of claim 1, wherein the coating comprises two or more unique polymers comprising:
a first polymer comprising water solubility; and
a second polymer comprising a block chain copolymer.

4. The composition of claim 1, wherein the granular fertilizer comprises one or more of a nitrogenous fertilizer, a phosphate fertilizer, or a potassium fertilizer.

5. The composition of claim 1, wherein the ion exchange nanoparticle comprises:
the structural particle, wherein the ion exchange site is one of a plurality of native ion exchange sites;
the ion, wherein the ion is one of a plurality of fertilizer ions;
wherein at least one of the plurality of fertilizer ions is attached to at least one of the plurality of native ion exchange sites of the structural particle; and
wherein the ion exchange nanoparticle causes a delayed release of the plurality of fertilizer ions.

6. The composition of claim 1, wherein the ion exchange nanoparticle is sprayed on to the granular fertilizer when the ion exchange nanoparticle is dissolved in water.

7. The composition of claim 1, wherein the ion exchange nanoparticle is adsorbed by the granular fertilizer on a surface of the granular fertilizer.

8. The composition of claim 1, wherein the composition is in a desiccated form, and wherein the composition is applied to soil in the desiccated form.

9. The composition of claim 1, wherein the composition is manufactured by:
heating the granular fertilizer to a liquid state to generate molten fertilizer;
adding the ion exchange nanoparticle to the molten fertilizer; and cooling the solution comprising the molten fertilizer and the ion exchange nanoparticle back to a solid state.

10. The composition of claim 1, wherein the granular fertilizer comprises a liquid loading potential such that the granular fertilizer adsorbs the ion exchange nanoparticle.

11. The composition of claim 1, wherein the composition is manufactured by:

electrostatically charging the ion exchange nanoparticle; and introducing the electrostatically charged ion exchange nanoparticle to the granular fertilizer.

12. The composition of claim 1, wherein the ion exchange nanoparticle is manufactured by generating a solution comprising ultrapure water, the structural particle, and the ion; and wherein the solution is dehydrated prior to introducing the ion exchange nanoparticle to the granular fertilizer.

13. The composition of claim 1, wherein the ion exchange nanoparticle comprises a plurality of fertilizer ions attracted to a plurality of unique ion exchange sites of the structural particle; and wherein the plurality of fertilizer ions comprises one or more of nitrogen, phosphate, or potassium.

14. The composition of claim 1, wherein the ion exchange nanoparticle comprises a plurality of fertilizer ions attracted to a plurality of unique ion exchange sites of the structural particle; and wherein the plurality of fertilizer ions comprises one or more of sulfur, calcium, magnesium, chlorine, manganese, iron, zinc, copper, molybdenum, or nickel.

15. The composition of claim 1, wherein the structural particle is a component of a fine-grained sedimentary rock.

16. The composition of claim 1, wherein the structural particle is a nanoparticle comprising a particle diameter from about 1 nm to about 1000 nm.

17. The composition of claim 1, wherein the structural particle comprises a high cation exchange capacity and an equivalents in a range from about 10 milliequivalents per 100 g to about 600 milliequivalents per 100 g.

18. The composition of claim 1, wherein the ion exchange site of the structural particle is naturally filled with a native ion, and wherein the native ion is exchanged with the ion prior to the ion exchange nanoparticle being combined with the granular fertilizer.

19. The composition of claim 1, further comprising one or more of an herbicide, a pesticide, a fungicide, or a plant growth regulator.

* * * * *